(12) United States Patent
Tseng et al.

(10) Patent No.: US 9,877,493 B2
(45) Date of Patent: Jan. 30, 2018

(54) AGING DELAYING MATERIAL FOR FRUITS AND VEGETABLES AND PRODUCING METHOD THEREOF

(71) Applicant: Plastic Industry Development Center, Taichung (TW)

(72) Inventors: Hsiang-Jung Tseng, Taichung (TW); Chia-Hsiang Peng, Taichung (TW); Ming-Hsien Sung, Taichung (TW)

(73) Assignee: PLASTICS INDUSTRY DEVELOPMENT CENTER, Taichung (TW)

( * ) Notice: Subject to any disclaimer, the term of this patent is extended or adjusted under 35 U.S.C. 154(b) by 374 days.

(21) Appl. No.: 14/582,265

(22) Filed: Dec. 24, 2014

(65) Prior Publication Data
US 2015/0181902 A1 Jul. 2, 2015

(30) Foreign Application Priority Data
Dec. 27, 2013 (TW) .............................. 102148593 A (51) Int. Cl.
| | |
|---|---|
| A23B 7/154 | (2006.01) |
| A23B 7/157 | (2006.01) |
| B65D 65/42 | (2006.01) |
| B65D 81/28 | (2006.01) |
| A23B 7/152 | (2006.01) |

(52) U.S. Cl.
CPC .............. *A23B 7/154* (2013.01); *A23B 7/152* (2013.01); *A23B 7/157* (2013.01); *B65D 65/42* (2013.01); *B65D 81/28* (2013.01); *A23V 2002/00* (2013.01)

(58) Field of Classification Search
CPC .......... B65D 81/28; B65D 65/42; B32B 5/22; B32B 5/30; A23B 7/154; A23B 7/157; A23B 7/152; C08J 3/12; C08J 3/128; C08J 3/215; C08J 7/04; C08J 7/042; C08K 7/26; C08K 9/06
See application file for complete search history.

(56) References Cited

U.S. PATENT DOCUMENTS

| | | | | |
|---|---|---|---|---|
| 4,670,288 A | * | 6/1987 | Ikari ...................... | A01N 59/16 106/15.05 |
| 4,939,030 A | * | 7/1990 | Tsuji ..................... | A23L 3/3418 428/315.5 |
| 2002/0110689 A1 | * | 8/2002 | Hu .......................... | B01J 20/20 428/375 |

OTHER PUBLICATIONS

Derwent Abstract JP 01284754 May 1988.*

* cited by examiner

*Primary Examiner* — Erik Kashnikow
*Assistant Examiner* — Lela S. Williams
(74) *Attorney, Agent, or Firm* — Alan D. Kamrath; Kamrath IP Lawfirm, P.A.

(57) ABSTRACT

A producing method of an aging delaying material for fruits or vegetables has steps of: adding and blending a silicon material, with the silicon material having porous structures or layer structures; gradually adding an ethylene reducing material and water or solvent in the silicon material during blending; and gradually removing the water or the solvent during blending until the water or the solvent is partially removed from the silicon material and the ethylene reducing material to form a dry mixing powder which is able to postpone fruits or vegetables becoming over mature.

6 Claims, 14 Drawing Sheets

AGING DELAYING MATERIAL FOR FRUITS AND VEGETABLES AND PRODUCING METHOD THEREOF

BACKGROUND OF THE INVENTION

1. Field of Invention

This invention is related to an aging delaying material and, especially, to a packing material for delaying fruits and vegetables aging, over maturing or decaying.

2. Description of the Related Art

Vegetables play an important part in human health. It has become a popular study in modern society since fruits and vegetables provide many benefits.

Food storage equipment like a refrigerator is very helpful to preserve fruits and vegetables. However, for the purpose of displaying in the market or for delivery, the fruits and vegetables are normally packed in plastic bags, increasing the decay problem thereof. Although there are some conventional multiple layered packing materials that try to extend a preservation time of fruits or vegetables, these existing packing materials have a worse aging delaying function.

SUMMARY OF THE INVENTION

In order to solve the disadvantages and shortcomings of the conventional packing materials such as insufficient fresh preserving ability, the present invention provides a producing method of an aging delaying material comprising:

adding and blending a silicon material, with the silicon material having a porous structure or layer structure;

gradually adding an ethylene reducing material and water or solvent in the silicon material during blending; and gradually removing the water or the solvent during blending until the water or the solvent is partially removed from the silicon material and the ethylene reducing material to form a dry mixing powder, with at least a partial surface of pores of the porous structures or layer structures of the silicon material coated or filled with the ethylene reducing material to form the dry mixing powder.

Thus, achievements and advantages of the present invention are listed below:

1. The silicon material in the present invention comprises a porous or layer structure. The porous or layer structure is capable of absorbing or catching ethylene released from fruits or vegetables.

2. The ethylene reducing liquid spray is gradually added into the silicon material during blending. Thus, the ethylene reducing material may be separated uniformly into the pores of the porous structure or the layer structures of the silicon material. The ethylene absorbing, catching or reacting abilities of the present invention have largely improved.

3. By the blending/water removing process stated as above, the present invention may be able to use less ethylene reducing materials compared to conventional packing materials, since the ethylene reducing materials are mounted on the surface of the silicon materials and have a large reacting surface with ethylene. The ethylene absorbing, catching or reacting abilities of the present invention are largely improved.

4. The present invention has at least 1.5 times the delaying ability compared to the conventional packing material for fruits or vegetables preservation.

5. The blend-promoting material of the present invention may not only improve the uniformity of the blending process but also provides colors or light shielding for final products of the present invention.

6. The present invention may be produced as multiple layer films or bags comprising a covered layer and an ethylene reducing layer. The covered layer may cover the ethylene reducing layer to avoid environmental ethylene or humidity/moisture reacting with the ethylene reducing material in the ethylene reducing layer. The cover layer may prolong the storage period of the present invention.

DETAILED DESCRIPTION OF THE INVENTION

Figure 1:
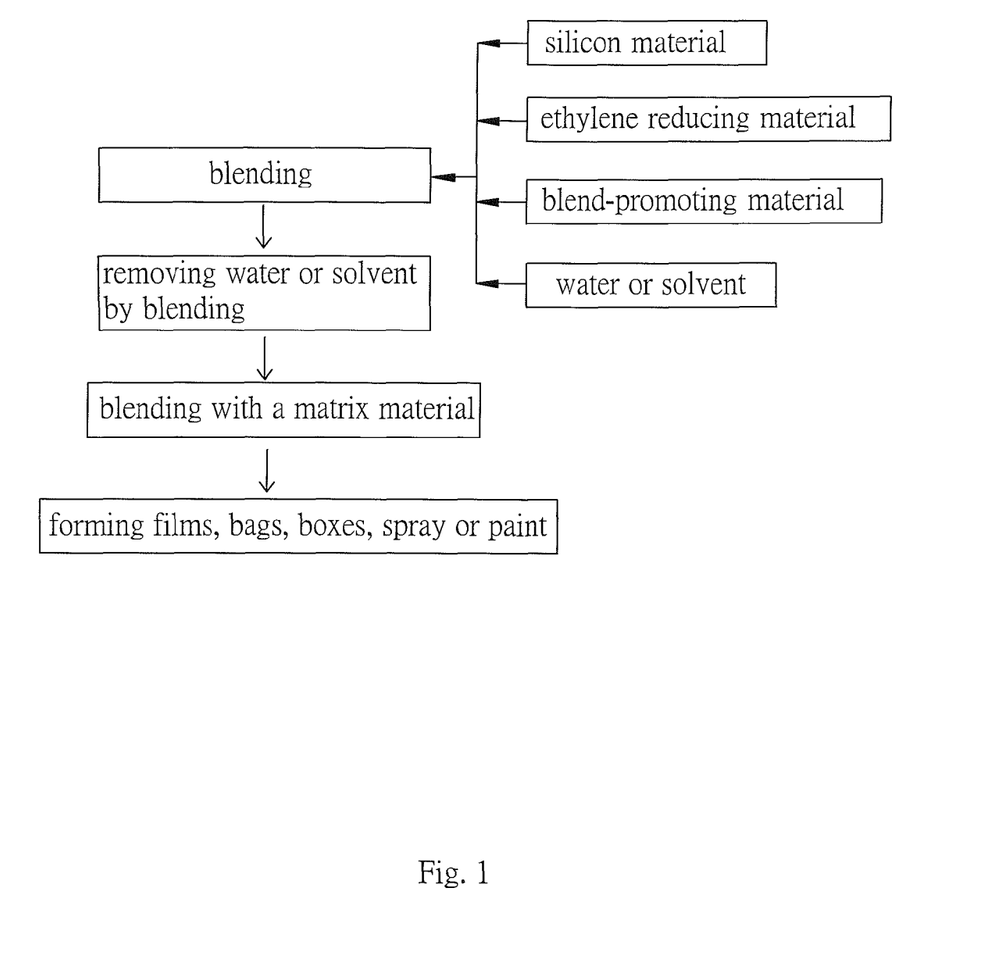
FIG. 1 is a producing process flow chart in accordance with the present invention.
Figure 2:
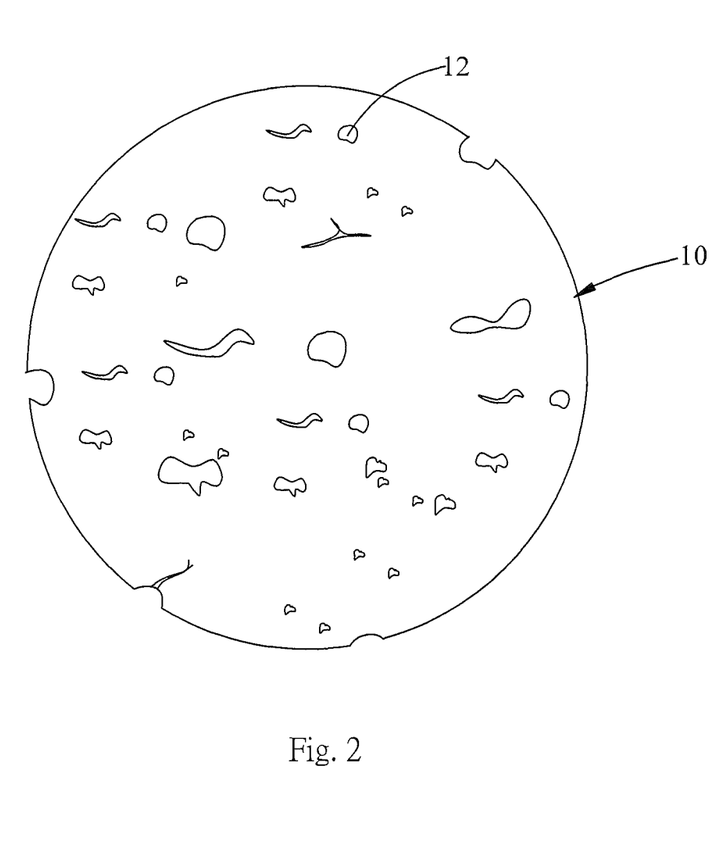
FIG. 2 is a schematic view of a silicon material with a porous structure of a preferred embodiment in accordance with the present invention.
Figure 3:
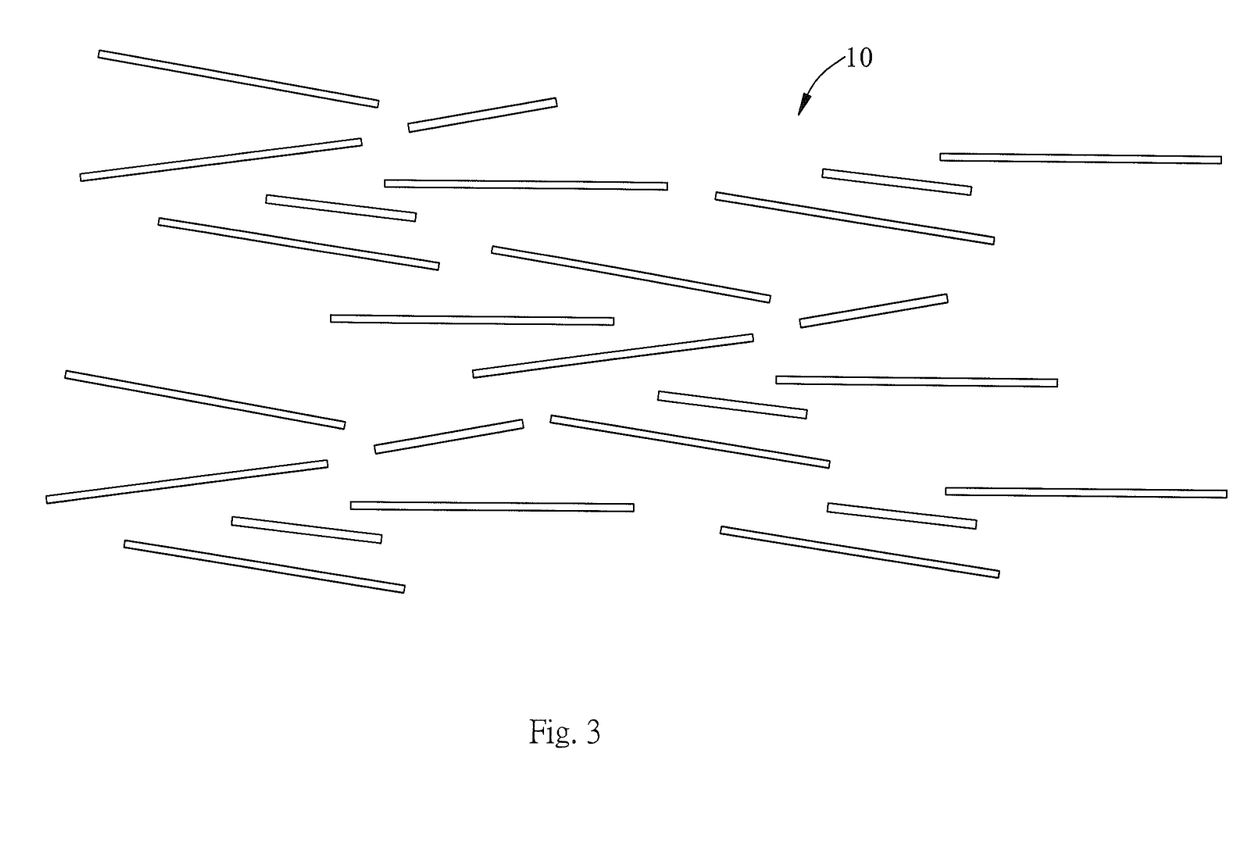
FIG. 3 is a schematic view of a silicon material with a layer structure of the preferred embodiment in accordance with the present invention.
Figure 4:
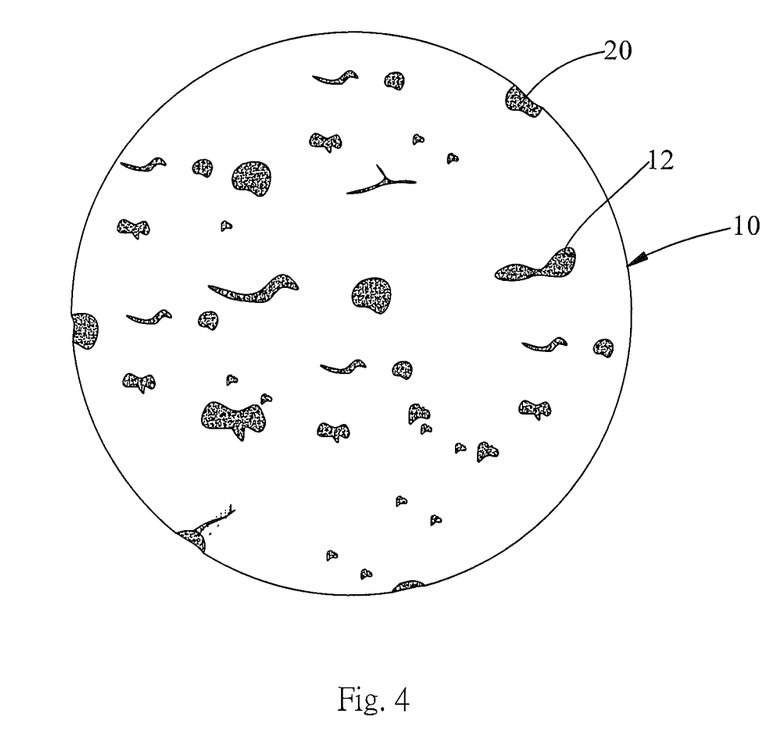
FIG. 4 is a schematic view of a modified silicon material with a porous structure of the preferred embodiment in accordance with the present invention.
Figure 5:
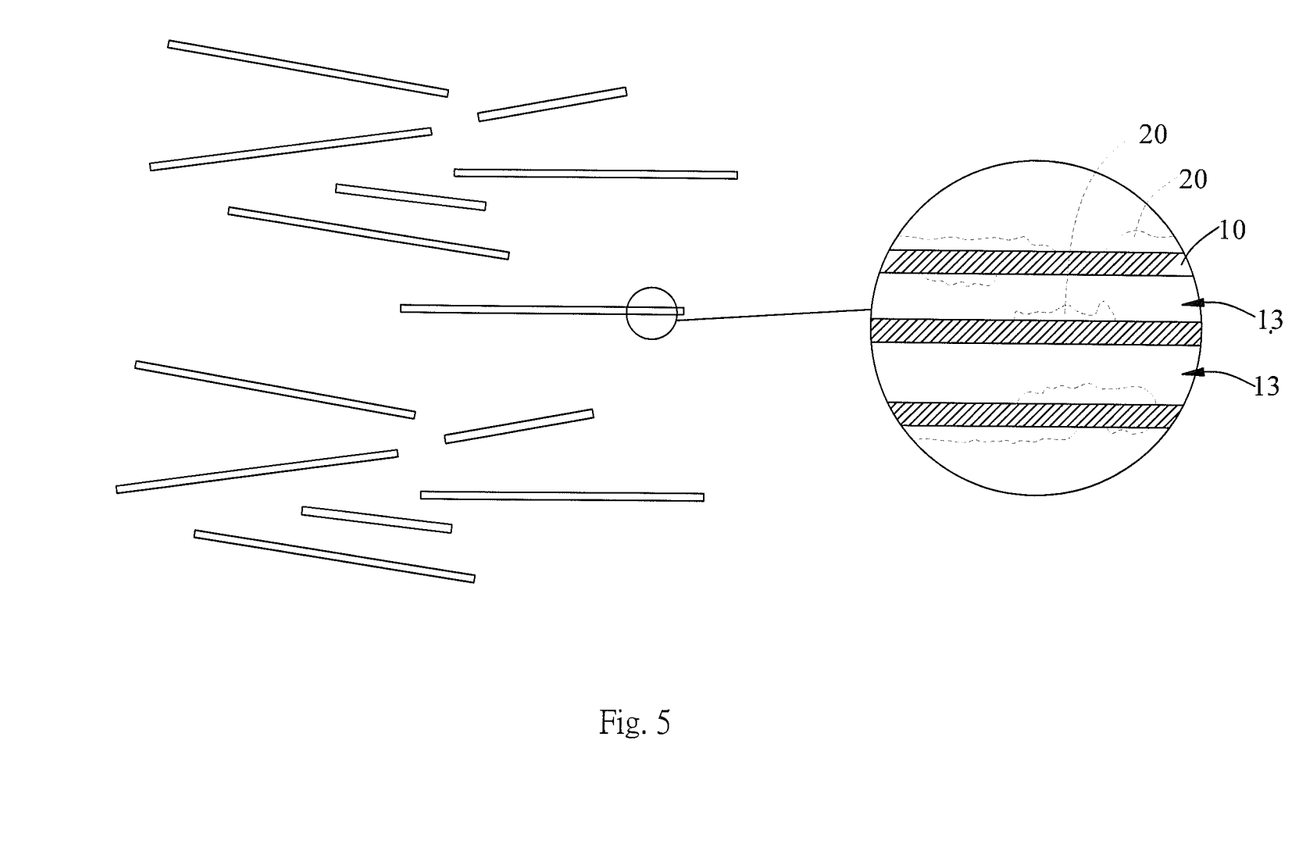
FIG. 5 is a partially enlarged cross-sectional schematic view of a modified silicon material with a layer structure of the preferred embodiment in accordance with the present invention.

With reference to FIG. 1, a preferred embodiment of a producing method of an aging delaying material for delaying fruits and vegetables aging or over maturing in accordance with the present invention has steps comprising:

(1) adding and blending a silicon material 10. The silicon material 10 may further be blended with a blend-promoting material in advance. The blend-promoting material may be calcium carbonate (CaCO3), titanium dioxide (TiO2), activated carbon or bamboo charcoal.

Harvested fruits or vegetables are continually releasing ethylene, which causes harvested fruits or vegetables aging, over maturing or decaying. With reference to FIG. 2 to FIG. 5, the silicon material 10 is preferred to be a silicon material with a porous structure, clay or a mixture thereof. Pores 12 of the silicon material 10 or the layer structures 13 of the silicon material 10 are capable of capturing or trapping ethylene therein. Thus, the silicon material 10 may be used to delay fruits or vegetables from aging or decaying. The silicon material 10 with the layer structure 13 is selected in the preferred embodiment since the layer structure 13 provides more surface areas than the porous structure, and since the silicon material 10 with the layer structure 13 may absorb or capture more ethylene therein.

The blend-promoting material is used to promote the silicon material to be blended more uniformly during the blending process. The blend-promoting material may further provide colors for final products of the present invention. For example, calcium carbonate may be used to produce transparent products. Titanium dioxide may be used to produce packing products with a white color. The activated carbon or the bamboo charcoal may be used to produce packing products requiring a black color or a light shielding function.

(2) adding and blending ethylene reducing material 20 with water or solvent into the silicon material 10. The ethylene reducing material 20 is preferred to form as an ethylene reducing solution with water or a solvent. The ethylene reducing solution may be gradually sprayed or dropped into the silicon material 10 during blending. The ethylene reducing material 20 is preferred to be uniformly dispersed into a suitable quantity of water or solvent. In the preferred embodiment, the ethylene reducing solution is preferred to be gradually sprayed or dropped into the silicon material 10 to increase the ethylene reducing material 20 being filled into the pores 12 or being permeated into the layer structures 13 of the silicon material 10. The ethylene reducing material 20 is capable of absorbing, catching, and trapping ethylene or of reacting with ethylene. The ethylene reducing material 20 may be bromide solution, potassium permanganate, potassium bromide or a mixture thereof. The solvent may be methanol, ethanol, acetone or methyl ethyl ketone (MEK). The ethylene reducing material 20 may be uniformly dispersed or permeated into the silicon material 10 because the ethylene reducing material 20 was sprayed gradually into the silicon material 10.

The ethylene reducing solution may further contain a bacteriostatic agent or an anti-fog agent. The bacteriostatic agent may be a silver ions releasing agent, a zinc ions releasing agent, an organic acid or amine. The anti-fog agent may be a surfactant like a nonionic surfactant.

(3) gradually removing the water or the solvent during blending until the water or the solvent is totally or partially removed from the silicon material 10 and the ethylene reducing material 20 to form a dry mixing powder.

Partial or all surfaces, partial or all pores 12 or partial or all layer structures 13 of the silicon material 10 are coated or filled with the ethylene reducing material 20 during the water removing and blending procedure to from the dry mixing powder. Schematic portions of the dry mixing powder are shown as FIG. 4 and FIG. 5. The aforementioned water or solvent removing and blending process may use a blending machine, such as a Henschel blender to blend under 400 RPM. To reduce the process time for blending and removing the water or solvent, a heating means may be used.

The heating means may comprise, but is not limited to, blending under humidity control and/or temperature control at a range of 85° C.~105° C. A higher blending temperature may reduce processes time to form the dry mixing powder. The dry mixing powder may be directly placed into a permeable bag and placed with fruits or vegetables to reduce ethylene released from the fruits or vegetables.

Figure 6:
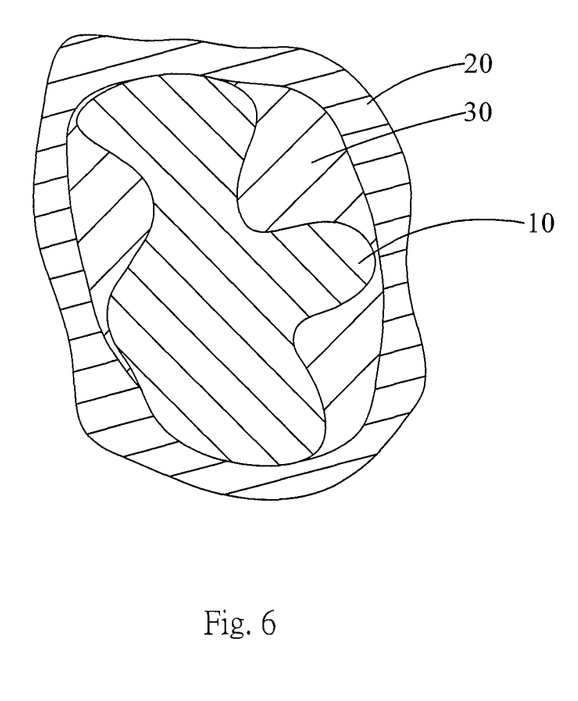
FIG. 6 is a cross-sectional schematic view of the modified silicon material with a porous structure of the preferred embodiment in accordance with the present invention.
Figure 7:
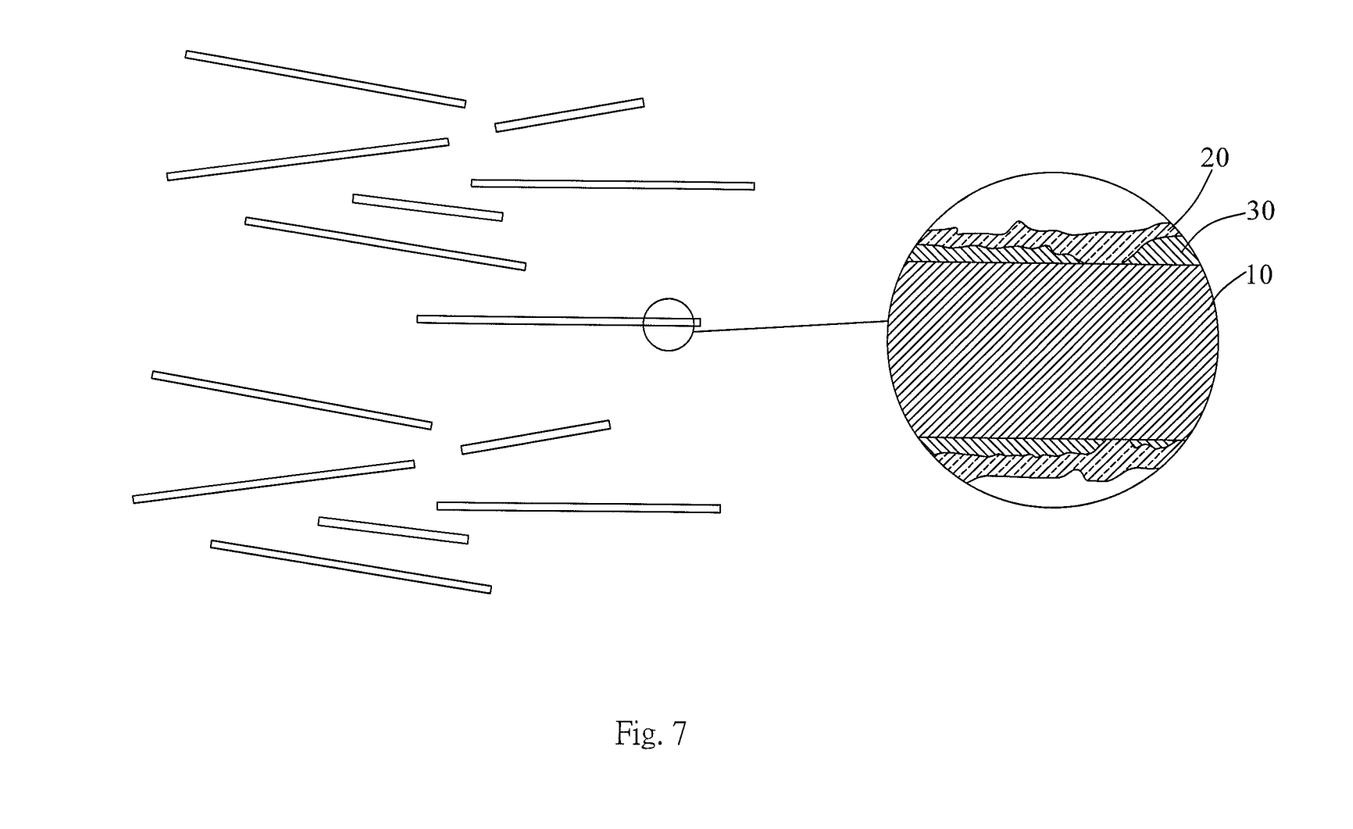
FIG. 7 is a cross-sectional schematic view of the modified silicon material with a layer structure of the preferred embodiment in accordance with the present invention.

With reference to FIG. 6 and FIG. 7, before or after step (2), a mould-proof material 30 may be added to coat the surfaces of the silicon material 10, may further be partially filled in the pores 12 or may be inserted in the layer structures 13 of the silicon material 10. In the preferred embodiment, the mould-proof material 30 is blended with the silicon material 10 until the water or solvent is totally or partially removed, and then is blended with the ethylene reducing solution to form the dry mixing powder by a blending process. Thus, the dry mixing powder may be formed as a core shell structure or a multiple layered structure as shown in FIG. 6 and FIG. 7. The mould-proof material 30 may be a sorbate such as 2, 4-hexadienoic acid potassium salt. The mould-proof material 30 may also be mixed with the water or the solvent to form a mould-proof solution. The mould-proof solution is sprayed or dropped into the silicon material 10 during the blending process, and the water or the solvent is gradually removed, so that the mould-proof material 30 is coated on the surface of the pores 12 of the porous structure or layer structure 13 of the silicon material 10.

Figure 7A:
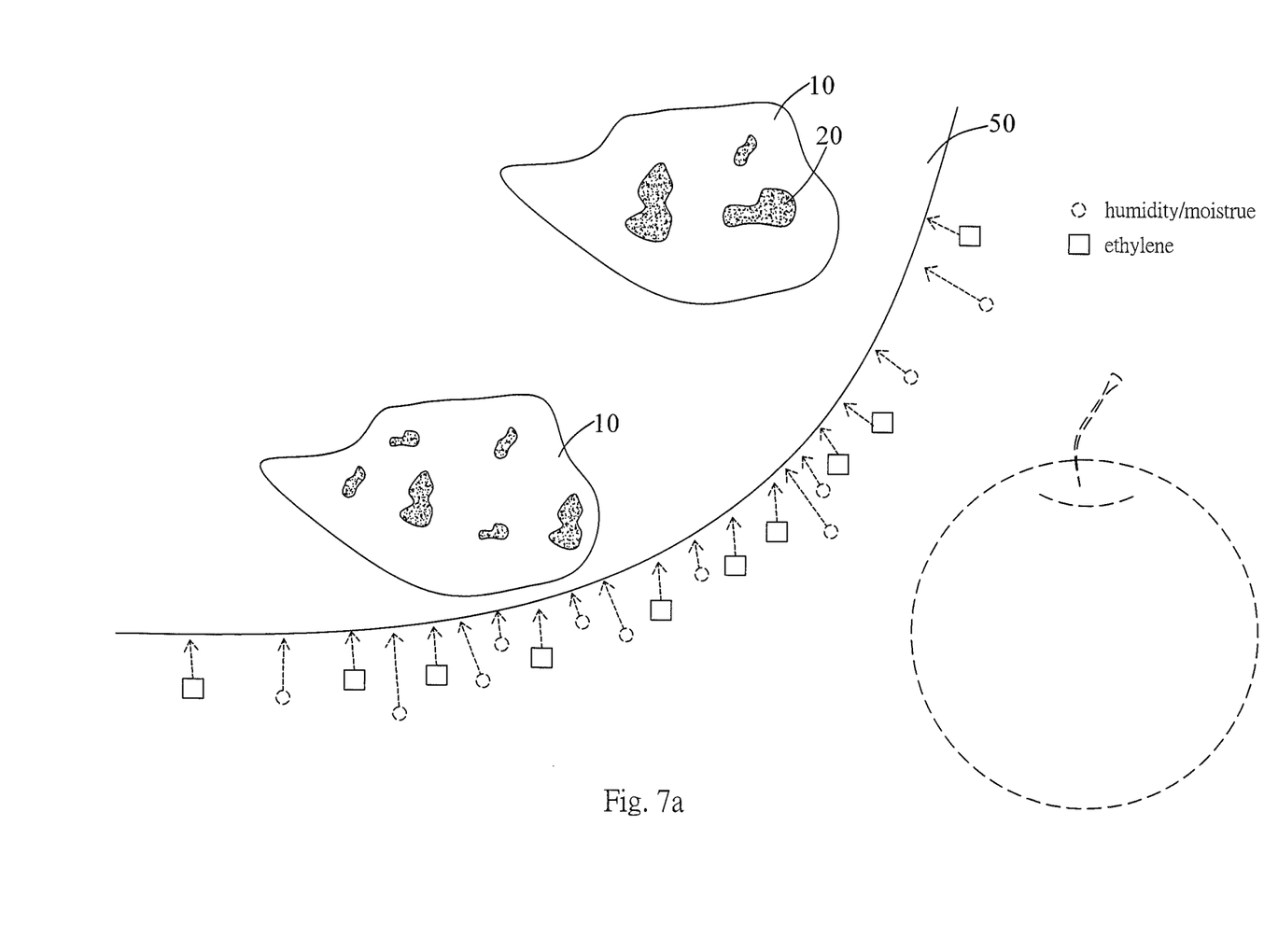
FIG. 7a is a schematic diagram of the silicon material inducing ethylene and humidity/moisture to surfaces of the preferred embodiment in accordance with the present invention.
Figure 7B:
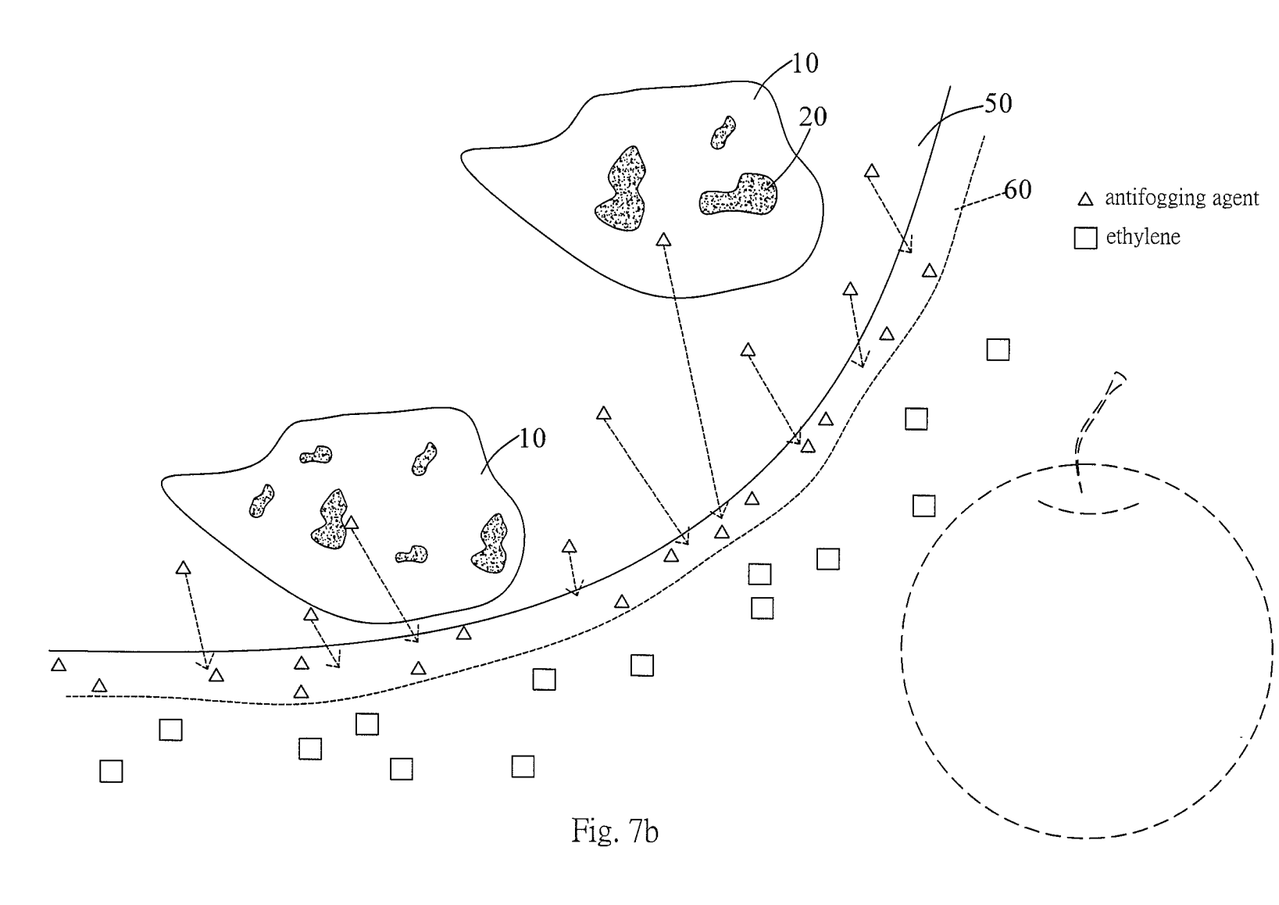
FIG. 7b is a second schematic diagram of the potassium permanganate being induced to a water membrane on a packing bag of the preferred embodiment in accordance with the present invention.
Figure 7C:
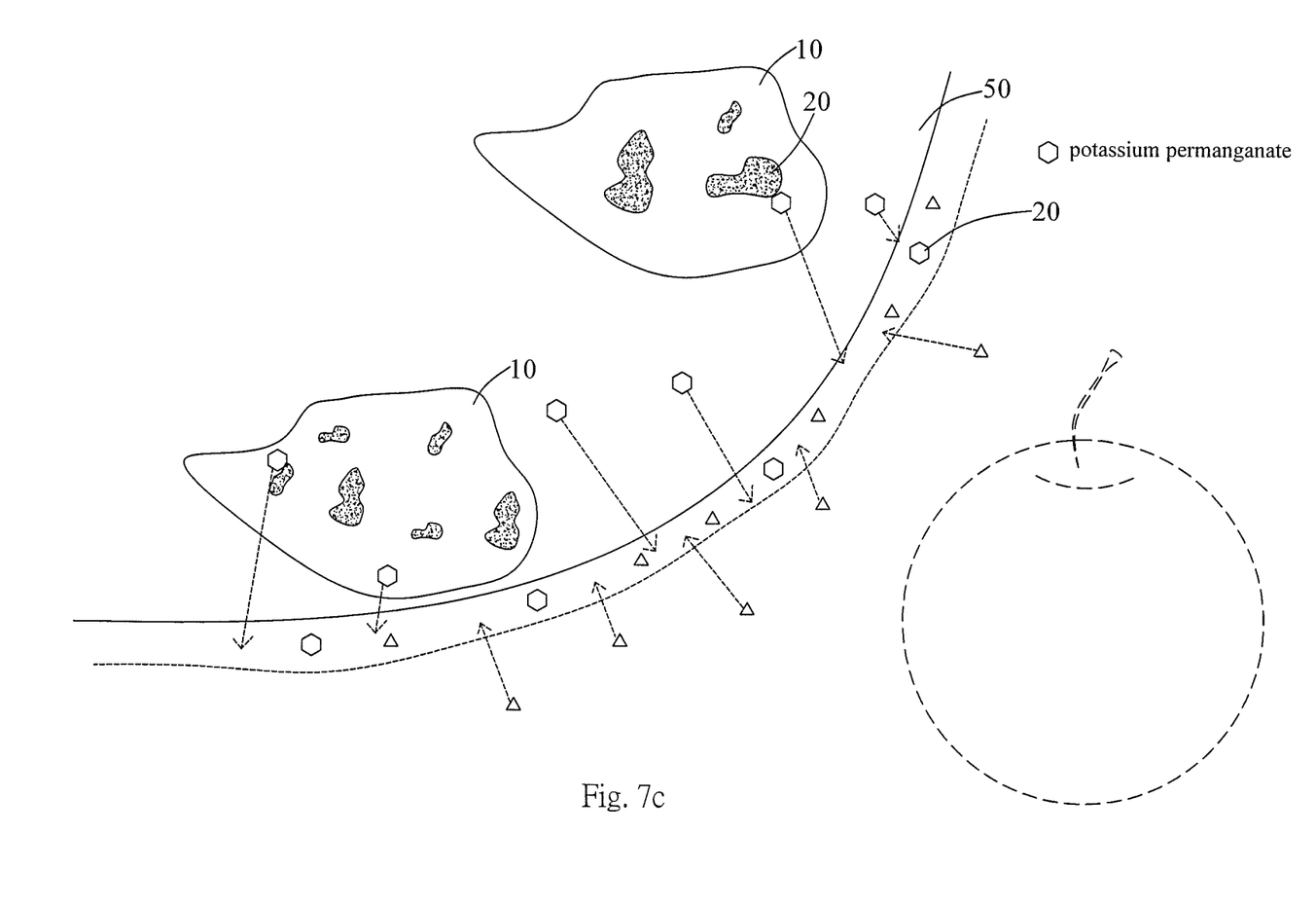
FIG. 7c is a third schematic diagram of the potassium permanganate absorbing, catching or reacting with ethylene in the packing bag of the preferred embodiment in accordance with the present invention.

With reference to FIG. 7a to FIG. 7c, in the preferred embodiment, while the potassium permanganate is added into the silicon material 10, the anti-fog agent may further be added into and be blended with the silicon material 10 to form the dry mixing powder with an anti-fog function. In practical use, the dry mixing powder may be used as a filler to be mixed with a plastic material, thus producing a packing bag for packing fruits or vegetables therein. The moisture inside the plastic bag may form a water membrane/film 60 on an inner surface of packing bag. The potassium permanganate in the packing bag tends to migrate to and solutes in the water membrane/film 60 of the surface due to the water solubility of the potassium permanganate. The potassium permanganate on the surfaces or near to the surfaces of the packing bag may have more chance of absorbing, catching or reacting with ethylene.

(4) uniformly blending the dry mixing powder with a matrix material. The matrix material may be polyethylene (PE), polypropylene (PP), polystyrene (PS), polyethylene terephthalate (PET) or a gum material.

Figure 8:
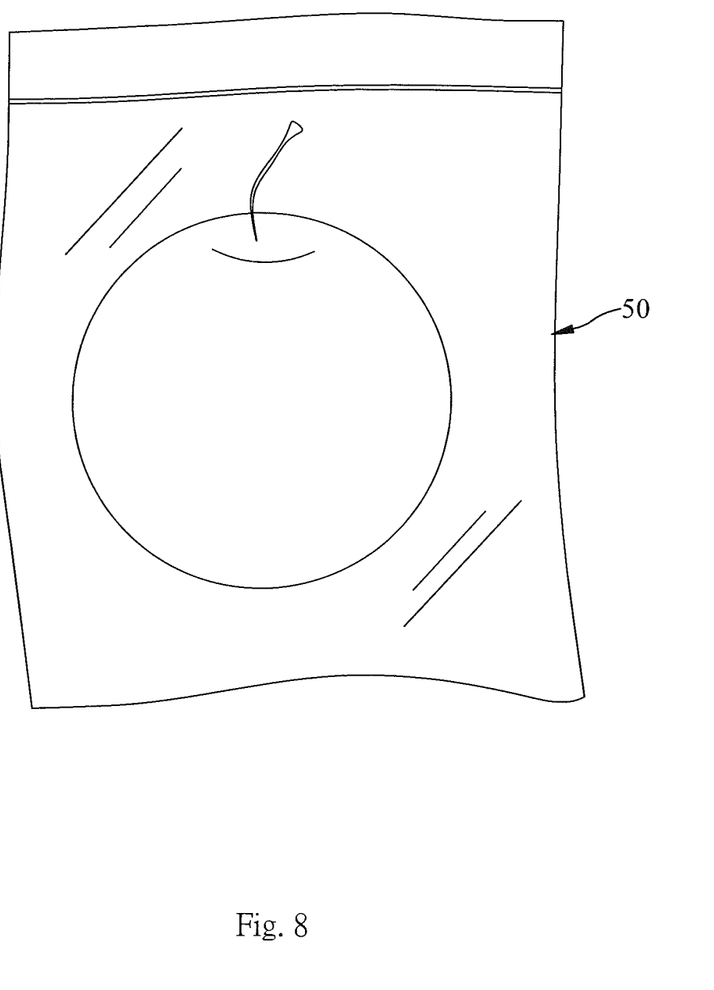
FIG. 8 is a perspective view of the packing bag packed with fruit inside in accordance with the present invention.

For instance, the dry mixing powder is blended with the matrix material by a twin screw blending machine and may be formed as, but is not limited to, a film, a bag 50 or a box for packing or containing fruits or vegetables. A foaming gas like propane or butane may further be mixed with the dry mixing powder and the matrix material to form a foam bag. The foam bag may further provide a protection function for fruits or vegetables. The foam bag may be mesh-like. Thus, the foam bag may be applied for fruits or vegetables with difference sizes. Holes of the mesh-like foam bag may further improve air circulation.

The dry mixing powder may further have multiple applications. For instance, the gum material may be blended with the dry mixing powder to form a spray or paint. The spray or paint may be applied on surfaces of ordinary packing materials like a film, bag or box to provide the ordinary packing materials having fruits or vegetables fresh preservation ability. The gum material may be polyvinyl alcohol (PVA), gelatin or Arabic gum. The viscosity of the gum material is around 30~40000 cps. The gum material may be dissolved into the water or solvent to form a gum solution and then mixed with the dry mixing powder to form the spray or the paint. The spray or the paint comprises 2~20 wt % of the gum material. Lower viscosity like 30~500 cps of the gum material may be used as a spray form. Higher viscosity like 500~40000 cps may be used as paints.

The present invention may further be produced as films or bags with multiple layers. The dry mixing powder may be blended with the matrix material to form an ethylene reducing layer. A covered layer without ethylene reducing ability is compressed with the ethylene reducing layer to form multiple layer films or bags. The covered layer may b; but is not limited to, polyethylene (PE), propylene (PP), polystyrene (PS) or polyethylene terephehalate (PET). The covered layer covers the ethylene reducing layer to prevent ethylene or moisture from environment and extends a preserve/storage time of the multiple layer films or bags.

Embodiment 1

In a simplified usage of the present invention, the dry mixing powder is suggested to be mixed into the matrix material and produced as plastic pellets.

In the first step to produce the plastic pellets, the silicon oxide with the porous structure (quantity of the silicon oxide may be 1~10 wt % of the plastic pellets, preferred with 2~3 wt %) is blended with titanium dioxide (with 0.2~2 wt % of the plastic pellets).

Second, 2, 4-hexadienoic acid potassium salt (with 0.2~4.0 wt % of the plastic pellets) solution is sprayed on the silicon oxide and the titanium dioxide during blending, and the water of the solution is gradually removed by blending or by using heating means, such as a heater or a temperature controller.

Third, potassium permanganate (with 2~8 wt % of the plastic pellets) solution is added and is continuously blended until the water is removed by blending or the assist heating means.

Finally, the bacteriostatic agent solution is added in and is continuously blended until the water is gradually removed to form the dry mixing powder. The dry mixing powder is used as fillers of the matrix material for producing the plastic pellets. The plastic pellets may further be produced into films or bags.

Embodiment 2

First, the layered clay (with 1~10 wt % of plastic pellets, preferred with 3~5 wt % of plastic pellets) is blended with bamboo charcoal (with 0.2~2 wt % of plastic pellets).

Second, 2, 4-hexadienoic acid potassium salt (with 0.2~4.0 wt % of the plastic pellets) methyl alcohol solution is sprayed, and the methyl alcohol is gradually removed by blending or by using heating means, such as a heater or a temperature controller.

Third, potassium permanganate (with 2~8 wt % of the plastic pellets) methyl alcohol solution is added and is continuously blended until the methyl alcohol is removed by blending or by the assist heating means.

Finally, the bacteriostatic methyl alcohol solution and anti-fog methyl alcohol solution are added in and are continuously blended, and the methyl alcohol is gradually removed to form the dry mixing powder. The dry mixing powder is used as fillers of the matrix material for producing the plastic pellets. The plastic pellets may further be produced into films or bags.

Embodiment 3

First, the porous silicon oxide (with 1~10 wt % of the plastic pellets, preferred with 2~3 wt %) is blended with calcium carbonate (with 0.2~2 wt % of the plastic pellets).

Second, 2, 4-hexadienoic acid potassium salt (with 0.2~4.0 wt % of the plastic pellets) solution is sprayed on the porous silicon oxide and calcium carbonate during blending, and the water of the solution is gradually removed by blending or by using heating means, such as a heater or a temperature controller.

Third, potassium permanganate (with 2~8 wt % of the plastic pellets) solution is added and is continuously blended until the water is removed by blending or by the assist heating means.

Finally, the bacteriostatic agent solution is added in and is continuously blended and the water is gradually removed to form the dry mixing powder. The dry mixing powder is used as fillers of the matrix material for producing the plastic pellets. The plastic pellets may further be produced into boxes.

Embodiment 4

First, the layered clay (with 1~10 wt % of plastic pellets, preferred with 3~5 wt % of plastic pellets) is blended with activated carbon (with 0.2~2 wt % of plastic pellets).

Second, 2, 4-hexadienoic acid potassium salt (with 0.2~4.0 wt % of the plastic pellets) solution is added and is blended with the layered clay and the activated carbon until the water is gradually removed by blending or by assisting with the heating means.

Third, potassium permanganate (with 2~8 wt % of the plastic pellets) solution is added and is continuously blended until the water is removed.

Finally, the bacteriostatic solution is added and is continuously blended until the water is removed to form the dry mixing powder. The dry mixing powder is used as fillers of the matrix material for producing the plastic pellets. The plastic pellets may further be produced into foam bags.

Embodiment 5

First, the porous silicon oxide (with 1~10 wt % of the plastic pellets, preferred with 2~3 wt %) is blended with potassium permanganate (with 2~8 wt % of the plastic pellets) solution until the water is removed.

Second, 2, 4-hexadienoic acid potassium salt (with 0.2~4.0 wt % of the plastic pellets) solution is gradually added and is continuously blended until the water is removed by the heating means.

Finally, the bacteriostatic agent solution is gradually added and is blended until the water is removed to form the dry mixing powder. The dry mixing powder is mixed with polyvinyl alcohol (PVA) to form the spray or the paint.

To prove the function of the dry mixing power, aging delaying test results of organic cucumbers are as follows. Results show that the present invention is proven to delay harvested fruits or vegetable aging, over maturing or decaying at room temperature (~25° C.). The present invention is able to extend the preservation time of fruits and vegetable for delivery, storage or displaying on the market shelf.

Figure 9A:
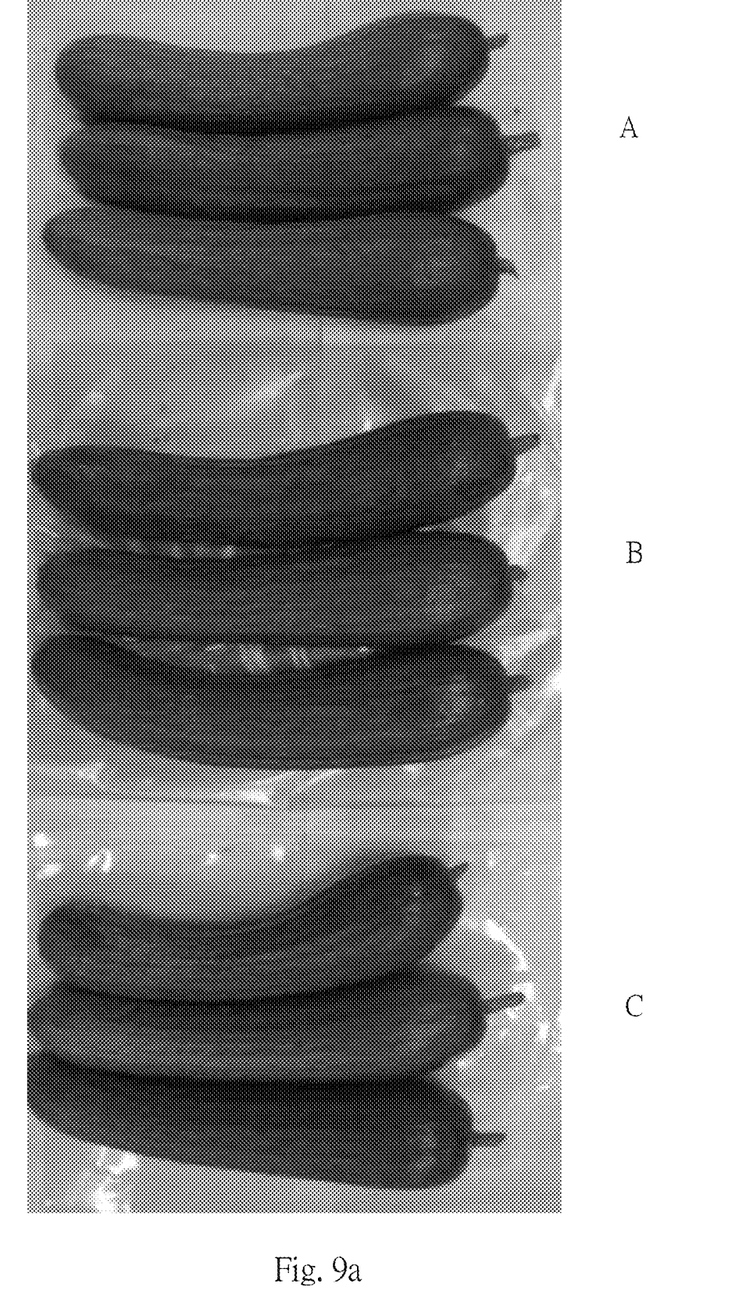
FIG. 9a are fruits over mature testing results at day 1 in accordance with the present invention.
Figure 9B:
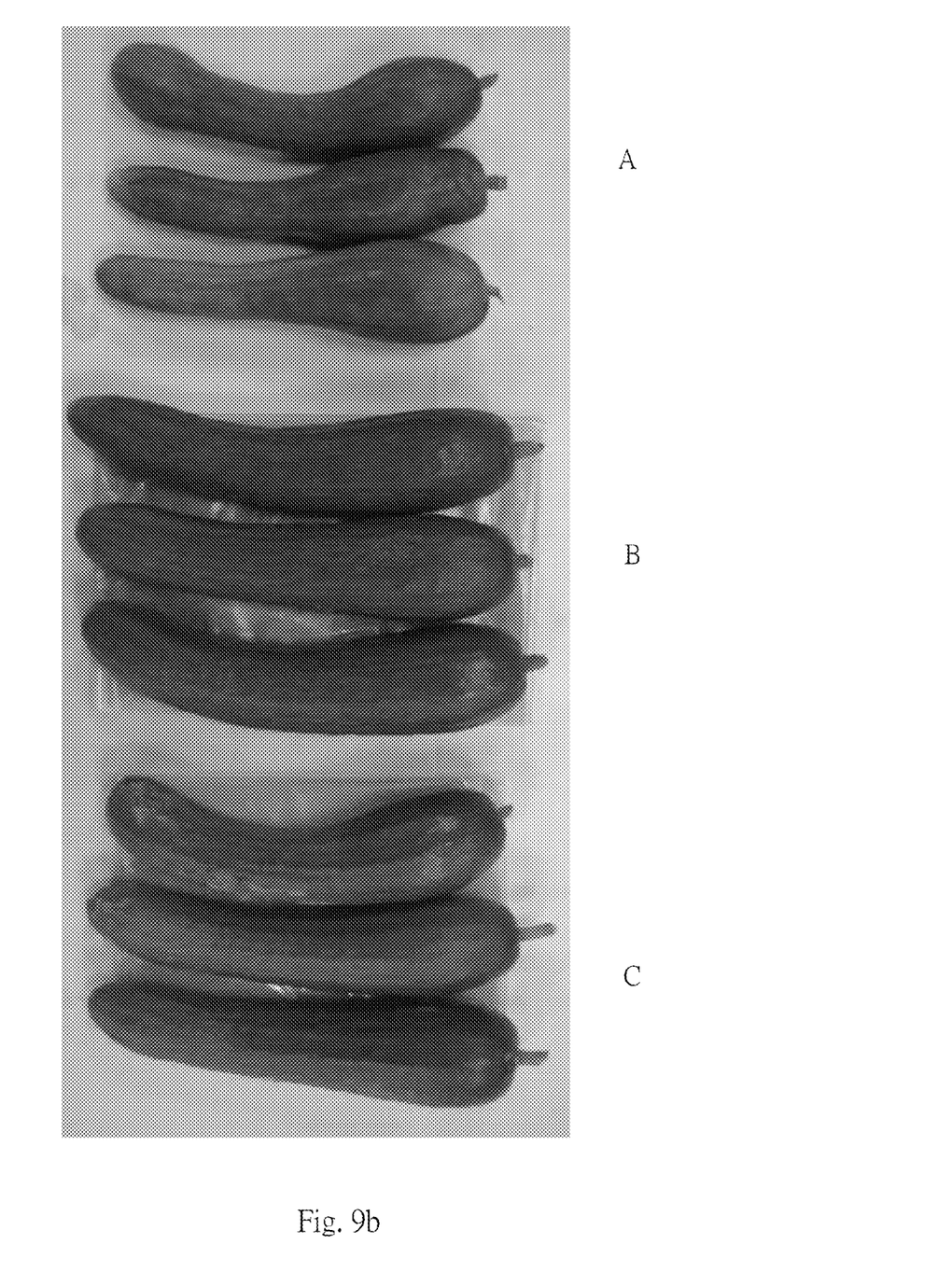
FIG. 9b are the fruits over mature testing results at day 7 in accordance with the present invention.
Figure 9C:
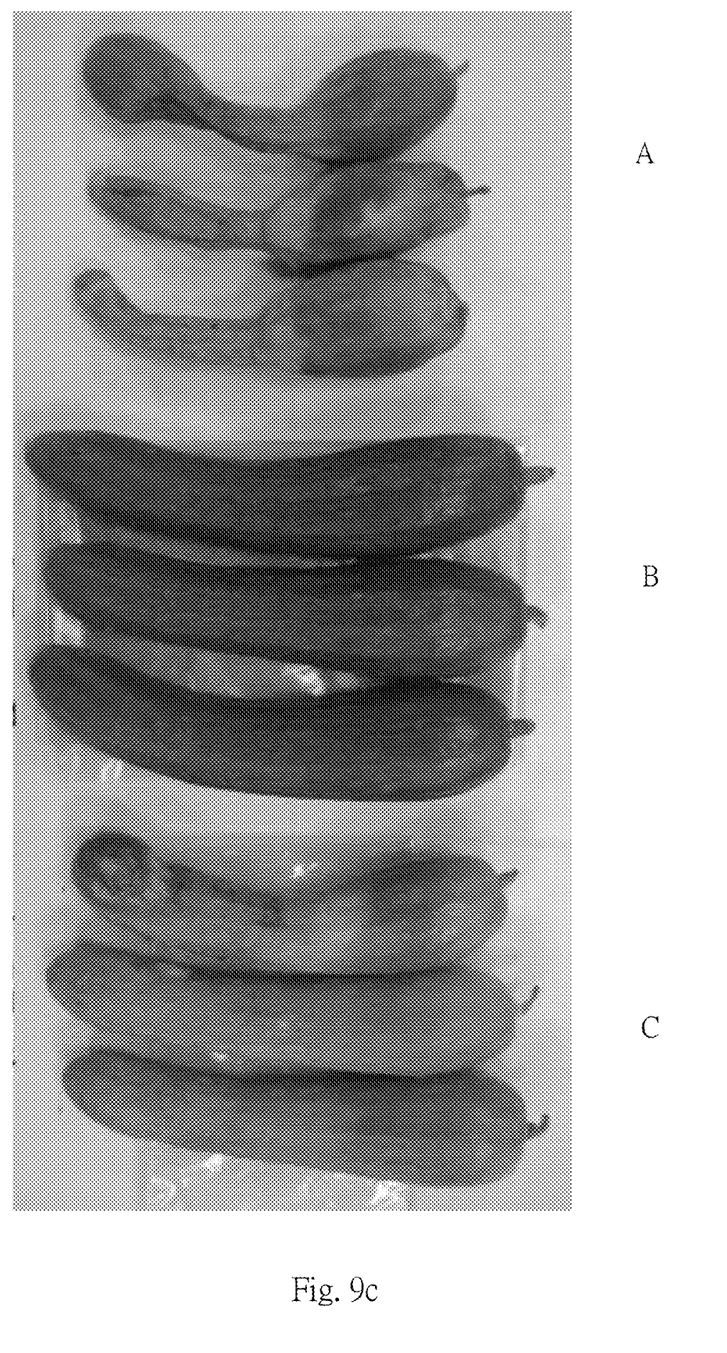
FIG. 9c are the fruits over mature testing results at day 11 in accordance with the present invention.

With reference to FIG. 9a, organic cucumbers aging delaying test results at day 1 are shown. Organic cucumber samples A, B and C all stay fresh at day 1. The weight of organic cucumber samples A, B and C are respectively 137 g, 160 g and 135 g. The organic cucumber sample A is placed without being packed. The organic cucumber sampleBis packed by a packing bag produced by the preferred embodiment of the present invention. The organic cucumber sample C is wrapped by a conventional PE film. With reference to FIG. 9b, the weight of organic cucumber samples A, B and C are respectively 93 g, 157 g and 131 g at day 7. The organic cucumber sample A shrinks at the bottom, becomes soft, and shows yellow spots on surfaces. The organic cucumber sample B does not show much difference compared with day 1. The organic cucumber sample C shows a yellow color at the bottom surface. With reference to FIG. 9c, the weight of organic cucumber samples A, B and C are respectively reduced as 69 g, 156 g and 130 g at day 11. The organic cucumber sample A shrinks more seriously, and the original green color totally changes into brown and yellow. The organic cucumber sample B still shows no difference compared to day 1. The organic cucumber sample C rots at the bottom, the texture becomes softer, of and the original green color totally changes into brown and yellow.

Thus, achievements and advantages of the present invention are listed as below:

1. The silicon material in the present invention comprises a porous or layered structure. The porous or layered structure is capable to absorb or catch ethylene released from fruits or vegetable.

2. The ethylene reducing liquid spray is gradually added into the silicon material during blending. Thus, the ethylene reducing material may be separated uniformly into the pores or the layered structures of the silicon material. The ethylene absorbing, catching or reacting abilities, of the present invention have largely improved.

3. By the blending/water removing process stated as above, the present invention may be able to use less ethylene reducing materials compared to conventional packing materials since the ethylene reducing materials are mounted on the surface of the silicon materials and have a large reacting surface with ethylene.

4. The present invention has at least 1.5 times the delaying ability compared to the conventional packing material for fruits or vegetables preservation.

5. The blend-promoting material of the present invention may not only improve the uniformity of the blending process but also provides colors or light shielding for final products of the present invention.

6. The present invention may be produced as multiple layer films or bags comprising a covered layer and an ethylene reducing layer. The covered layer may cover the ethylene reducing layer to avoid environmental ethylene or humidity/moisture reacting with the ethylene reducing material in the ethylene reducing layer. The cover layer may prolong the storage period of the present invention.

What is claimed is:

1. A producing method of an aging delaying material for fruits or vegetables comprising:
   providing a silicon material, wherein the silicon material has porous structures or layer structures;
   mixing an ethylene reducing material and water or a solvent to form an ethylene reducing solution;
   gradually spraying during blending the ethylene reducing solution in the silicon material; and
   gradually removing the water or the solvent during blending to form a dry mixing powder, wherein at least a partial surface of pores of the porous structures or the layer structures are coated or filled with the ethylene reducing material to form the dry mixing powder.

2. The producing method of the aging delaying material for fruits or vegetables as claimed in claim 1, further comprising blending the silicon material with a blend-promoting material before being gradually sprayed and blended with the ethylene reducing.

3. The producing method of the aging delaying material for fruits or vegetables as claimed in claim 1, further comprising uniformly blending the dry mixing powder with a matrix material and forming a film, a bag, a foam bag, a box or a foam bag.

4. The producing method of the aging delaying material for fruits or vegetables as claimed in claim 2, further comprising uniformly blending the dry mixing powder with a matrix material to form a film, a bag, a foam bag, a box or foam bag.

5. The producing method of the aging delaying material for fruits or vegetables as claimed in claim 1, further comprising uniformly blending the dry mixing powder with a gum material to form as a spray or a paint.

6. The producing method of the aging delaying material for fruits or vegetables as claimed in claim 2, further comprising uniformly blending the dry mixing powder with a gum material to form as a spray or a paint.

* * * * *